US009655001B2

(12) United States Patent
Metzger et al.

(10) Patent No.: US 9,655,001 B2
(45) Date of Patent: May 16, 2017

(54) CROSS MUTE FOR NATIVE RADIO CHANNELS

(71) Applicant: Cisco Technology, Inc., San Jose, CA (US)

(72) Inventors: Larry R. Metzger, Wake Forest, NC (US); Mark Conrad Gonsalves, Chandler, AZ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/863,649

(22) Filed: Sep. 24, 2015

(65) Prior Publication Data

US 2017/0094555 A1   Mar. 30, 2017

(51) Int. Cl.
| | |
|---|---|
| *H04M 1/00* | (2006.01) |
| *H04W 28/04* | (2009.01) |
| *G10L 21/0224* | (2013.01) |
| *H04L 29/06* | (2006.01) |
| *H04M 9/08* | (2006.01) |
| *G10L 21/02* | (2013.01) |
| *H04M 3/00* | (2006.01) |
| *G10L 21/0208* | (2013.01) |
| *H04L 12/64* | (2006.01) |

(52) U.S. Cl.
CPC ........... *H04W 28/048* (2013.01); *G10L 21/02* (2013.01); *G10L 21/0208* (2013.01); *G10L 21/0224* (2013.01); *H04L 63/061* (2013.01); *H04M 3/002* (2013.01); *H04M 9/08* (2013.01); *H04M 9/082* (2013.01); *G10L 2021/02082* (2013.01); *H04L 2012/6491* (2013.01)

(58) Field of Classification Search
CPC ........ H04M 9/08; H04M 9/082; H04M 3/002; G10L 21/02; G10L 21/0208; G10L 21/0224; H04R 17/02; H04W 28/048; H04L 63/061; H04L 2012/6491
USPC ..................... 455/571, 570; 348/611; 381/66
See application file for complete search history.

(56) References Cited

U.S. PATENT DOCUMENTS

| | | | |
|---|---|---|---|
| 6,760,436 B1 * | 7/2004 | Takada .................. | H04M 9/082 379/406.01 |
| 7,751,348 B2 | 7/2010 | Shaffer et al. | |
| 7,792,899 B2 | 9/2010 | Shaffer et al. | |
| 7,860,070 B2 | 12/2010 | Shaffer et al. | |
| 8,145,249 B2 | 3/2012 | Shaffer et al. | |
| 8,405,539 B2 * | 3/2013 | Saitto .................. | G01S 13/9029 342/25 A |
| 8,495,142 B2 | 7/2013 | Shaffer et al. | |
| 2004/0141608 A1 * | 7/2004 | Imata .................... | H04M 9/082 379/406.08 |

(Continued)

*Primary Examiner* — Dominic Rego
(74) *Attorney, Agent, or Firm* — Lempia Summerfield Katz LLC

(57) ABSTRACT

In one implementation, systems and processes are provide for local cross muting between two or more dispatch consoles in a dispatch center. Sound is received from a microphone of a first console. The first console generates an outgoing media signal from the received sound and a supplementary outgoing data. The supplementary outgoing data may be an identification number for the first console or a duplicate media signal from the first console. The first console sends the outgoing media signal to a forwarding device and sends the supplementary outgoing signal to a second console.

19 Claims, 8 Drawing Sheets

(56) References Cited

U.S. PATENT DOCUMENTS

| | | | | |
|---|---|---|---|---|
| 2004/0264686 A1* | 12/2004 | Enzner | H04M 9/082 | 379/406.08 |
| 2006/0126822 A1* | 6/2006 | Schmidt | H04M 9/082 | 379/406.01 |
| 2007/0121926 A1* | 5/2007 | Le Gall | H04B 3/234 | 379/406.01 |
| 2007/0239824 A1 | 10/2007 | Shaffer et al. | | |
| 2008/0031467 A1* | 2/2008 | Haulick | H04M 9/082 | 381/66 |
| 2008/0071547 A1* | 3/2008 | Prieto | B60N 2/002 | 704/275 |
| 2008/0310459 A1* | 12/2008 | Date | H04J 3/0676 | 370/503 |
| 2009/0265491 A1* | 10/2009 | Zhang | G06F 3/023 | 710/72 |
| 2010/0208908 A1* | 8/2010 | Hoshuyama | H04M 9/082 | 381/66 |
| 2010/0272251 A1* | 10/2010 | Banba | H04B 3/20 | 379/406.08 |
| 2012/0135787 A1* | 5/2012 | Kusunoki | H04M 1/0214 | 455/575.8 |
| 2013/0083937 A1* | 4/2013 | Arai | H04B 3/23 | 381/66 |
| 2013/0191119 A1* | 7/2013 | Sugiyama | H04B 3/23 | 704/226 |
| 2013/0216056 A1* | 8/2013 | Thyssen | H04M 9/082 | 381/66 |
| 2013/0287203 A1* | 10/2013 | Hodges | H04M 9/082 | 379/406.01 |
| 2014/0010382 A1* | 1/2014 | Jeong | G10K 11/16 | 381/66 |
| 2014/0057671 A1* | 2/2014 | Fumarolo | H04W 76/005 | 455/520 |
| 2014/0229033 A1* | 8/2014 | Cook | G05B 19/00 | 701/2 |
| 2014/0278381 A1* | 9/2014 | Dehghani | H04M 9/082 | 704/206 |
| 2015/0003606 A1* | 1/2015 | Nemer | H04M 9/082 | 379/406.01 |
| 2015/0050967 A1* | 2/2015 | Bao | H04M 9/082 | 455/570 |
| 2015/0133097 A1* | 5/2015 | Jang | H04M 3/568 | 455/416 |
| 2015/0228266 A1* | 8/2015 | Higuchi | G10K 11/16 | 381/71.11 |
| 2015/0229353 A1* | 8/2015 | Berthelsen | H04M 9/082 | 379/406.08 |
| 2015/0294675 A1* | 10/2015 | Hammarqvist | G10L 21/0208 | 704/226 |
| 2015/0326967 A1* | 11/2015 | Otani | H04R 1/028 | 381/114 |
| 2015/0334333 A1* | 11/2015 | Kuwahara | H04N 5/44513 | 348/552 |
| 2016/0035366 A1* | 2/2016 | Matsuo | G10L 21/02 | 381/66 |
| 2016/0036624 A1* | 2/2016 | Roy | H04L 41/0668 | 370/221 |

* cited by examiner

CROSS MUTE FOR NATIVE RADIO CHANNELS

TECHNICAL FIELD

This disclosure relates in general to the field of dispatch communications, and more particularly, to the utilization of echo cancellation to perform console cross mute in dispatch communications.

BACKGROUND

An echo is a copy of sound that is delayed and heard after the original sound. An echo may occur because sound is reflected off of an object or a surface (e.g., a wall of a room or a canyon). An echo may also occur in telephony when one sound produced at side A of a telephone circuit is output at side B but also received at a microphone at side B and output back to side A.

Echo may also occur in dispatch centers. Dispatch centers may be used in solutions for taxis, ride sharing, emergency services, trucking, package delivery, or other services. In a dispatch center, multiple consoles may be located in proximity to each other such that sound in the dispatch room may be delivered through a communication network to the other consoles. Because of the slight delay of the communication network, the delivered sound echoes the sounds heard in real time in the dispatch center. A dispatcher may become distracted or frustrated when the dispatcher can hear his or her own voice coming from an adjacent console. In some examples, the echoed voice may also loop back in to the microphone of the dispatcher, which may causes echoes or other severe audio distortions within the conversation such as local audio feedback.

BRIEF DESCRIPTION OF THE DRAWINGS

Exemplary embodiments of the present embodiments are described herein with reference to the following drawings.

DESCRIPTION OF EXAMPLE EMBODIMENTS

Overview

Figure 1:
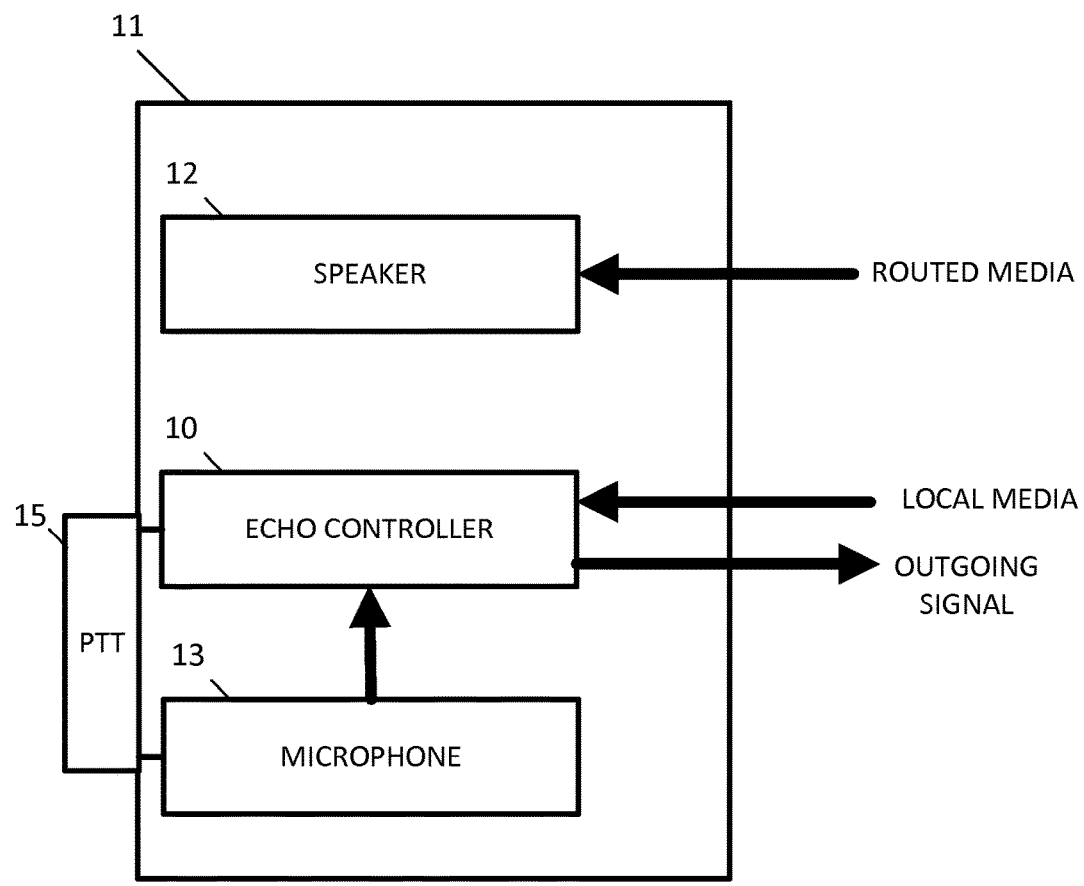
FIG. 1 illustrates an example of a dispatch console with cross muting for echo cancellation from duplicate media.

In an embodiment, a method comprises receiving sound from a microphone of a first console, generating an outgoing media signal from the received sound, generating a supplementary outgoing signal, sending the outgoing media signal to a forwarding device, and sending the supplementary outgoing signal to a second console.

In an embodiment, a media signal is received, at a first console, from a forwarding device. The media signal includes data from a second console mixed with one or more other sources. Also received at first console is an echo signal from the second console and subtracting the echo signal from the media signal to generate an output signal. The output signal is provided to a user.

EXAMPLE EMBODIMENTS

A dispatch system may use radio over internet protocol (IP) to communicate with land mobile radio (LMR), which may be handheld radios or stationary radio that utilize radio transmission. In order to combine LMR with IP service, VoIP technology voice gateways may be used in combination with additional LMR specific features to address interoperability, extending command and control, and other issues. Base stations, repeaters, and dispatch consoles may include an interface to monitor audio received from an air interface, and as input for audio to be transmitted on the air interface.

The audio may be encoded with an audio codec (e.g., G.711 or G.729 as established and maintained by the International Telecommunication Union (ITU)). Audio samples may be packaged in real-time transport protocol (RTP) packets suitable for transport on an IP network. Because the communication element is separated from the distinctive characteristics of each radio system, radios of different manufacturers and different types of users may be selectively combined in a single system. The audio packets can be sent across the network to other LMR gateways with different types of radio systems either individually (unicast) or as a group (multicast). In addition, the receiving device may be any device capable of receiving and decoding the RTP packets (e.g., LMR gateway, IP telephone, or computer).

However, multiple types of communication systems may be bridged together over IP networks as a hybrid system. In the hybrid system, media is being mixed at multiple different points, and it becomes impossible to have a single cross mute controller, or have coordination between cross mute controllers to make decisions regarding audio muting.

Radio dispatch centers may be used in a variety of areas. In one example, emergency services are provided from a radio dispatch center including operators or dispatchers arranged in proximity to one another (e.g., in the same room). One operator may be able to hear another operator directly through sound traveling in the radio dispatch center. Normally dispatchers are trained to block out other conversations and focus on their own conversation. As described above, the dispatcher may become very distracted when the dispatcher's own voice coming from an adjacent console is audible while the dispatcher is talking.

In order to minimize this effect, a cross mute may be applied to the adjacent consoles. The cross mute technique allows other consoles in proximity of the transmitting console, where a dispatcher is talking, to mute the talking dispatch during the transmitting console's transmission. The muting is handled by a remote cross mute controller that determines whether or not to block media that would be sent back to a set of other consoles based on one or more rules. One definition of a console cross mute may be the prevention of a transmission of one dispatcher from being heard at the dispatch console of another dispatcher whose speakers are within earshot of the transmitting dispatcher. In other words, the console cross mute prevents acoustic feedback.

The rules may define of a cross mute group and corresponding identification value. When a dispatcher logs into a console, a cross mute identification value based on the physical location of the dispatcher or the console. All dispatchers or consoles in a unique location may use the same cross mute identification value. When communicating, the consoles transmit the cross mute identification value along with the audio. Receiving consoles receive the audio and compare the received cross mute identification value to their own. If there is a match, the console mutes the audio.

However, in hybrid bridging systems with different manufacturers and different types of users, some consoles may not be compatible with the cross mute identification value or another type of metadata. Also, some systems may mix together sources of audio into a single signal. The cross mute identification value cannot be used if all audio sources are combined, and it is impossible to selectively mute audio.

One example is in systems that have native Project 25 (P25) radio communications and legacy radio communications. P25 includes standards for radio communications including channel assignment, modulation techniques, and encryption algorithms. In this case one dispatcher is on a P25 channel, while the neighboring dispatcher is on a legacy channel and they are patched together through a gateway. When the P25 dispatcher talks, the media goes through a gateway into the P25 system where the concept of cross mute is lost and plays out on the legacy channel, thereby causing confusion and feedback for the talker.

The following embodiments provide a cross mute solution that does not include a remote cross mute controller. Instead, this distributed approach to cross muting includes a local cross mute controller at the dispatch center. Media that is sent out for communication is also duplicated and shared between consoles.

FIG. 1 illustrates an example of a dispatch console 11 with cross muting for echo cancellation from duplicate media. The dispatch console 11 includes an echo controller 10, a speaker 12, and a microphone 13. Additional, fewer, or different components could be included in the dispatch console 11.

The microphone 13 collects sound waves and converts the sound waves to sound. The microphone 13 may include an acoustic-to-electric transducer or sensor that converts sound waves to electrical impulses or signals. The echo controller 10 receives sound data or sound signals from the microphone 13 of the dispatch console 11.

The dispatch console 11 may be a push to talk (PTT) system. A user pushes a button to transmit sound to other units. A PTT button 15 may trigger the push to talk function. The PTT button 15 may be electrically connected to a switch that selectively connects and disconnects the microphone 13 to power or to the echo controller 10.

The echo controller 10 may generate an outgoing signal that is sent to one or more other local consoles. The outgoing signal may have multiple components or signals. Different components or signals that make up the outgoing signal may be sent to different destinations. For example, portions may be sent directly to other local consoles and portions may be sent to a centralized server, computer, or forwarding device 40.

The outgoing signal may include the media produced by the microphone 13. In response to receiving the sound signals, the echo controller 10 generates the outgoing signal from the received sound. The outgoing media signal may be a digital signal sampled from the sound signals. Through a communication interface and using a communication protocol, the outgoing media signal to a forwarding device remote from the dispatch console 11.

In one example, the outgoing signal also includes a control signal that identifies the local console or a group of local consoles. The other local console may remove or mute the dispatch console 11 based on the control signal.

In another example, the outgoing signal also includes a duplicate copy of the media. The echo controller 10 may duplicate the outgoing media signal as an outgoing echo signal. Through the same or a different communication interface, the outgoing echo signal is sent to a second console.

In either the control signal example or the duplicated media example, the dispatch console 11 and the second console may be hard wired together with a dedicated communication path between consoles. For example, a network of wires may connect the dispatch consoles in the dispatch center for distributing echo signals between dispatch consoles, which will be discussed in more detail below. Alternatively, the connection between the dispatch console 11 and the second console may occur through another network (e.g., local area network, packet switched network, the Internet) or through a separate channel in radio communication.

Figure 2:
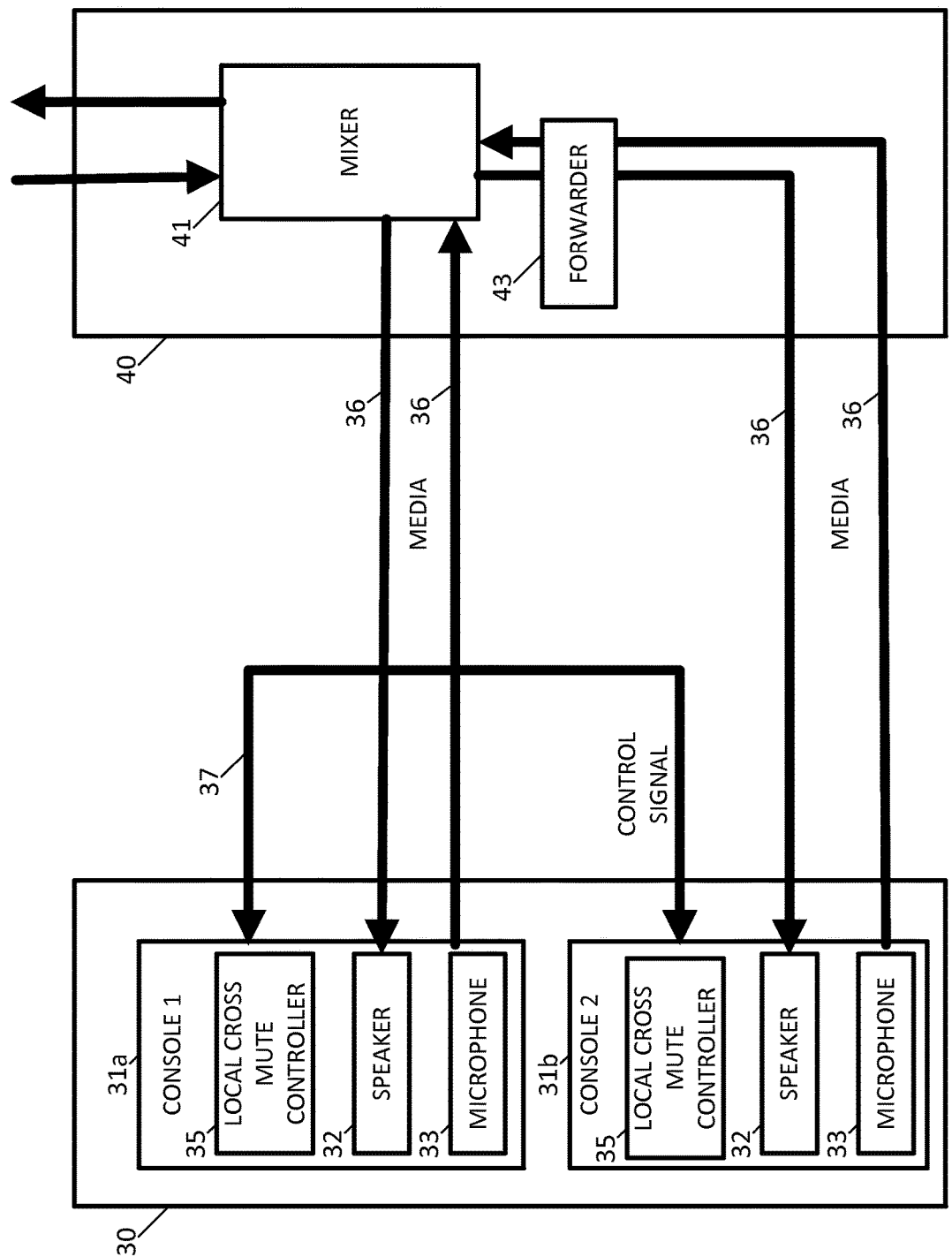
FIG. 2 illustrates an example system of local consoles with signaling for cross muting.

FIG. 2 illustrates an example system of local consoles with signaling for cross muting using the control signal example. The system includes a dispatch center 30 and an external control device 40. The dispatch center 30 includes two or more consoles, such as console 31a and console 31b. Each console includes a local cross mute controller 35, a speaker 32, and a microphone 33. The control device 40 may include a mixer 41 and a forwarder 43. Additional, different, or fewer components may be included.

The local cross mute controller 35 receives sound data from the microphone 33 of console 31a. The sound data may be in in a pulse width modulated (PWM) format generated from the analog signal produced by the microphone. The local cross mute controller 35 sends the outgoing media signal from the received sound. The outgoing media signal may be in the format of a voice over internet protocol (VoIP) packet. The format may be defined according to a codec such as a G.711 or G.729. The packet may include a payload and one or more headers. The headers may include a combination of a real time transport protocol (RTP), a uniform datagram packet (UDP), a link header and/or an IP header.

The local cross mute controller 35 may combine the outgoing media signal with an identification number. The identification number may be incorporated in any of the headers of the packets. Alternatively, the identification number may be included in a signaling packet at the beginning of each transmission. The identification number may be a value assigned to every console in a dispatch center. The local cross mute controller 35 may access the identification number from memory. The identification number may be a user provided value. The identification number may be associated with a login value. In another example, the identification value may be set by a physical switch on the console 31a. For example, the physical switch may be a dual in-line package (DIP) switch. If multiple DIP switches for a group of consoles are set to the same setting, the respective local cross mute controller 35 of the consoles generate the same identification values.

The identification number may represent other types of groups. For example, consoles in a group may be located in the same room, the same side of a room, or the same floor. The groups may be defined according to one or more channels. For example, two consoles may have the same identification value when they are in the same dispatch center or part of a dispatch center and use the same channel or combined channels.

The identification number may be automatically detected. For example, the consoles 31a and 31b may include position devices (e.g., global positioning system) that detect their locations. The identification numbers may be based on the locations. Similar locations may have similar identification values. In another example, the consoles 31a and 31b may detect IP addresses and base the identification numbers on IP addresses. Similar IP address may have similar identification values.

For example, consider a dispatch center with consoles A, B, and C. Console A operates on channel 1, console B operates on channel 2, and console C operates on channel 1. In one scenario, consoles A, B, and C are in the same group and have the same identification value. In another scenario consoles A and C have the same identification value and console B has a different identification value.

In another example, consider a dispatch center with consoles A, B, and C. Console A operates on channel 1, console B operates on channels 1 and 2, and console C operates on channel 2. In one scenario, consoles A, B, and C are in the same group and have the same identification value. In another scenario, consoles A has a first identification number and console C has a second identification value. Console B may be associated with both the first and second identification value. Alternatively, console B may be associated with a third identification value that provides cross muting for consoles with either the first identification value or second identification value.

The local cross mute controller 35 generates a control signal from the sound data and including data indicative of the identification number. The local cross mute controller 35 of the first console 31a sends the identification value to console 31b through a communication path 37. The local cross mute controller 35 of the console 31b retrieves the identification value from the control signal and compares the received identification value to a stored identification value. When the identification number received from the console 31a matches the identification number stored at the console 31b.

The local cross mute controller 35 of console 31a also sends the outgoing media signal including the identification number to a forwarding device 40. The forwarding device 40 is a gateway, a server, or another network device that facilitates IP communication between the console and one or more radios or consoles. The forwarding device 40 may be a land mobile radio network gateway that connects the console 31a to the radio network.

The forwarding device 40 sends the media signal to the console 31b. The console 31b modifies the media signal according to the control signal received from the console 31a. Console 31b receives the incoming media signal from the forwarding device 40 and identifies the identification value from the header or header packet. Console 31b compares the identification value from the incoming media signal to the identification value from the control signal.

When there is a match, console 31b removes the incoming media signal, or the portion of the incoming media signal that is associated with identification value and console 31a. The incoming media signal may include multiple portions index by identification values. Removing the portion of the incoming media signal completely mutes the nearby talking console. In another example, the console 31b attenuates or reduces the signal for the matching portion. The reduction may be in a predetermined amount (e.g., 10 dB, 50%). Alternatively, the user of the console 31b may set the desired attenuation amount for the neighboring consoles. The attenuation control may be in steps of 10 dB from a minimum attenuation to a maximum attenuation (e.g., 0 dB, 10 dB, 20 dB . . . 100 dB).

The forwarding device 40, an external device with respect to the consoles 31a-b, may combine multiple audio signals from remote land mobile radios or dispatch consoles is other dispatch centers. The mixer 41 may receive multiple audio signals from different sources and combine the audio signals into a single signal. For example, the mixer 41 may receive the media signal from console 31b and mix it with signals from other sources. The console 31a may receive the combined signal (external incoming media signal) from the forwarding device 40.

Figure 3:
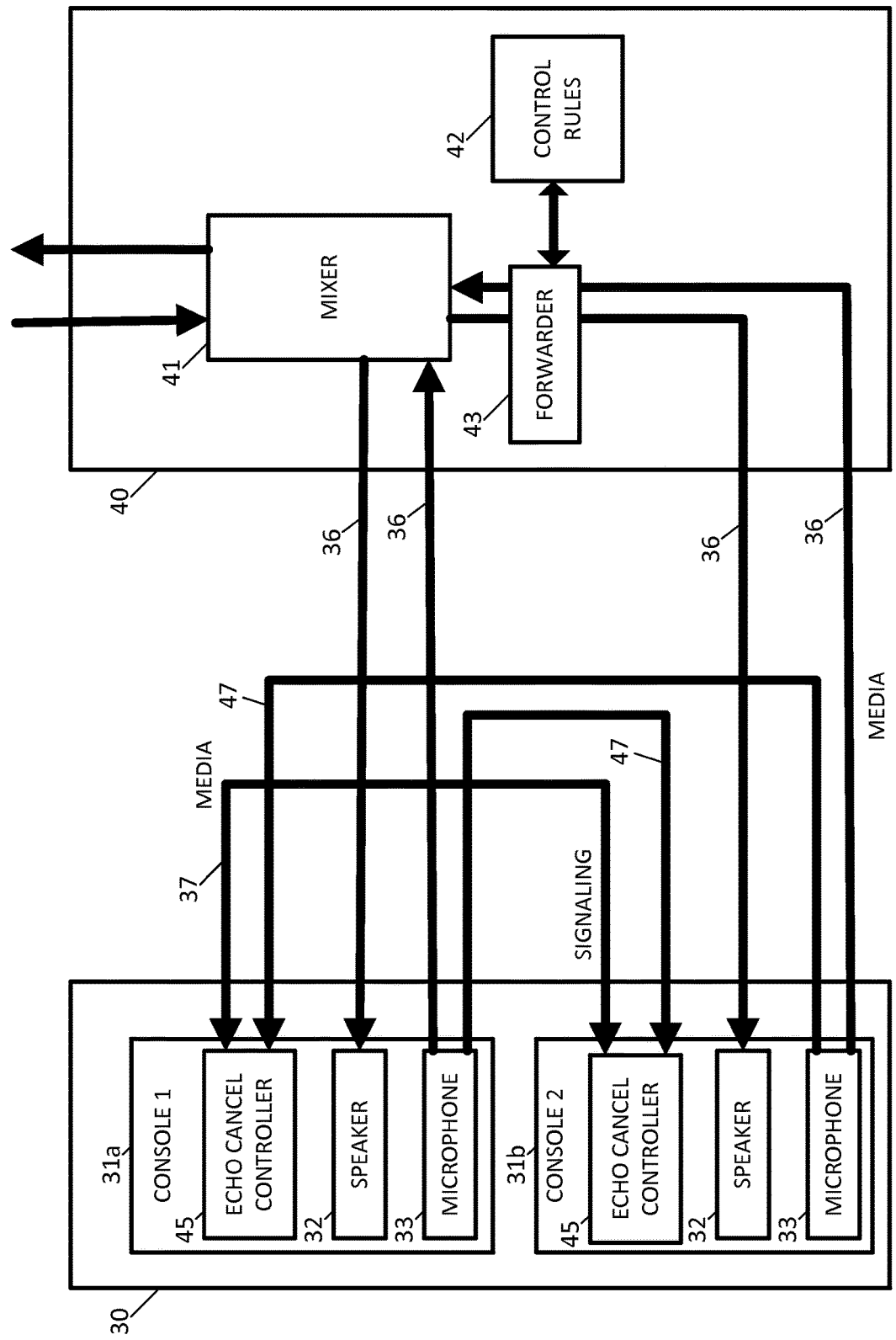
FIG. 3 illustrates an example system of local consoles with cross muting for echo cancellation from duplicate media.
Figure 4:
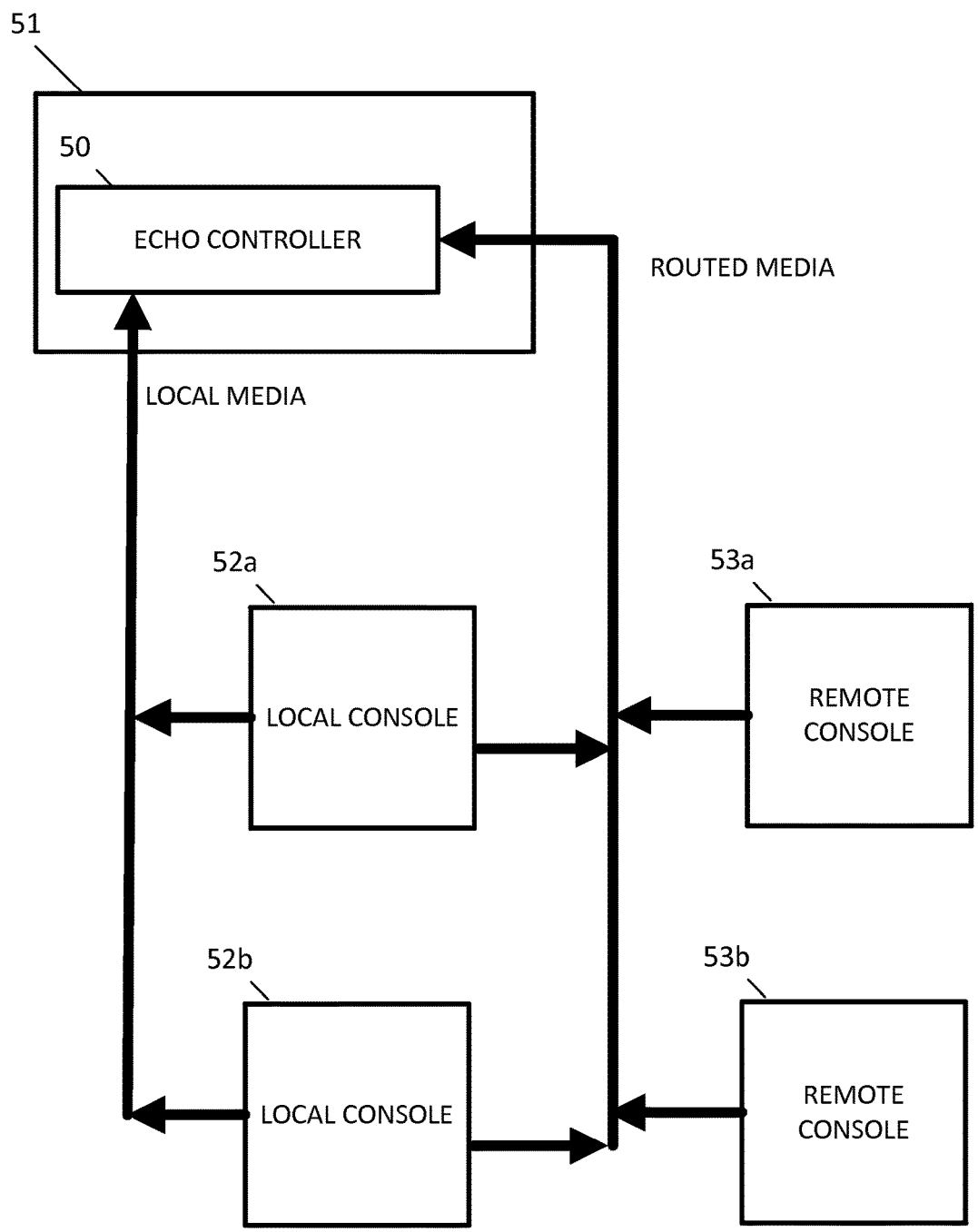
FIG. 4 illustrates an example system of local consoles with cross muting for echo cancellation from duplicate media.

FIG. 3 illustrates an example system of local consoles with cross muting for echo cancellation using the duplicated media example. The system includes a dispatch center 30 and an external control device 40. The dispatch center 30 includes two or more consoles, such as console 31a and console 31b. Each console includes a local echo cancellation controller 45, a speaker 32, and a microphone 33. The control device 40 may include a mixer 41 and a forwarder 43 that follows control rules 42. Additional, different, or fewer components may be included.

The echo cancellation controller 45, or microphone circuity, receives sound data from the microphone 33 of console 31a. The sound data may be in in a pulse width modulated (PWM) format generated from the analog signal produced by the microphone. The echo cancellation controller 45, or microphone circuity sends the outgoing media signal with the received sound to the external control device 40. FIG. 3 illustrates a communication path 36 from the microphone 33 to the external control device 40, but the outgoing media signal may be sent from the microphone circuitry directly or routed through the echo cancellation controller 45. The communication path 36 may represent a native radio channel.

The outgoing media signal may be in the format of a voice over internet protocol (VoIP) packet. The format may be defined according to a codec such as a G.711 or G.729. The packet may include a payload and one or more headers. The headers may include a combination of a real time transport protocol (RTP), a uniform datagram packet (UDP), a link header and/or an IP header.

The echo cancellation controller 45 may also generate supplementary outgoing data or a signal including a duplicate of the outgoing media signal or the sound data. The echo cancellation controller 45 may duplicate the outgoing media signal as an outgoing echo signal. The echo cancellation controller 45 may initiate the duplication based on a PTT signal (e.g., received from the PTT button 15). The outgoing echo signal may be an echo canceler talk burst that is sent on a dedicated channel. The dedicated channel may be a mirror channel to that native radio channel. The echo cancellation controller 45 may send the supplementary outgoing data to the console 31b and/or one or more other consoles. The dedicated channel may be a set of wires or another type of physical communication path 47.

The echo cancellation controller 45 of console 31a also sends the outgoing media signal to a forwarding device 40. The forwarding device 40 is a gateway, a server, or another network device that facilitates IP communication between the console and one or more radios or consoles. The forwarding device 40 may be a land mobile radio network gateway that connects the console 31a to the radio network. The forwarding device 40 sends the media signal to the console 31b.

The console 31b, and any other dispatch consoles that are in any cross mute group, may receive this simulcast stream (e.g., both the mirror channel and the native radio channel). Each of these streams may be uniquely identified so the receiving consoles can cancel multiple streams at once for glare conditions. The echo cancellation controller 45 subtracts the duplicated media signal (outgoing echo signal) received via the mirror channel from the received media signal received via the real channel.

The subtraction may occur before or after the stream has been converted to pulse code modulation to be played to the speakers. Various techniques may be used for the subtraction dependent on the echo cancellation circuitry. In some examples, multiple instances of the echo cancellation circuitry may be arranged electrically is series, and each of the instances of the echo cancellation circuitry may cancel one of a group of sources. Thus, if there are multiple glared active speakers, each are cancelled based on the received cancellation talk burst, before being played back.

The echo cancellation controller 45 may correlate the duplicated media signal to the received media signal in time. The correlation may involve a delay monitor and an adaptive filter that compensates for the time delay based on the different communication paths. The delay monitor and/or the adaptive filter may be implemented with circuitry or a microprocessor.

Rather than subtracting the duplicated media signal or outgoing echo signal from the full media signal or real channel, the echo cancellation controller 45 may attenuate the portion of the full media signal corresponding to the duplicated media signal. The attenuation may be in a predetermined amount (e.g., 10 dB, 50%). Alternatively, the user of the console 31b may set the desired attenuation amount for the neighboring consoles. The attenuation control may be in steps of 10 dB from a minimum attenuation to a maximum attenuation (e.g., 0 dB, 10 dB, 20 dB . . . 100 dB).

In one example, no remote cross mute controller is part of the control device 40. However, in some embodiments a remote cross mute controller may be included to provide redundant cross mute control. For example, control rules 42 may include logic for providing a cross mute. However, the control rules 42 may only apply when the dispatch consoles are the same model and/or manufacturer or otherwise compatible. Additional cross muting may be provided using the communication path 47.

The consoles 31a-b may also use encryption. In one example, the console 31b receives an encryption key from a key exchange with the console 31a. The console 31b encrypts the outgoing echo signal and the outgoing media signal using the encryption key. The consoles 31a-b may follow a key exchange algorithm.

In one example, the key exchange is implemented by a central server (e.g., key exchange server) that distributes the keys to the consoles 31a-b. The keys may be automatically distributed to the consoles 31a-b by the central server, or individual servers may request keys when needed. In some examples, the keys are exchanged at the beginning of a time period (e.g., each day) or upon initialization of a new console (e.g., installation of the console or initiation of communication). In some examples, the key exchange server may be provided by a third party key management service.

Figure 5:
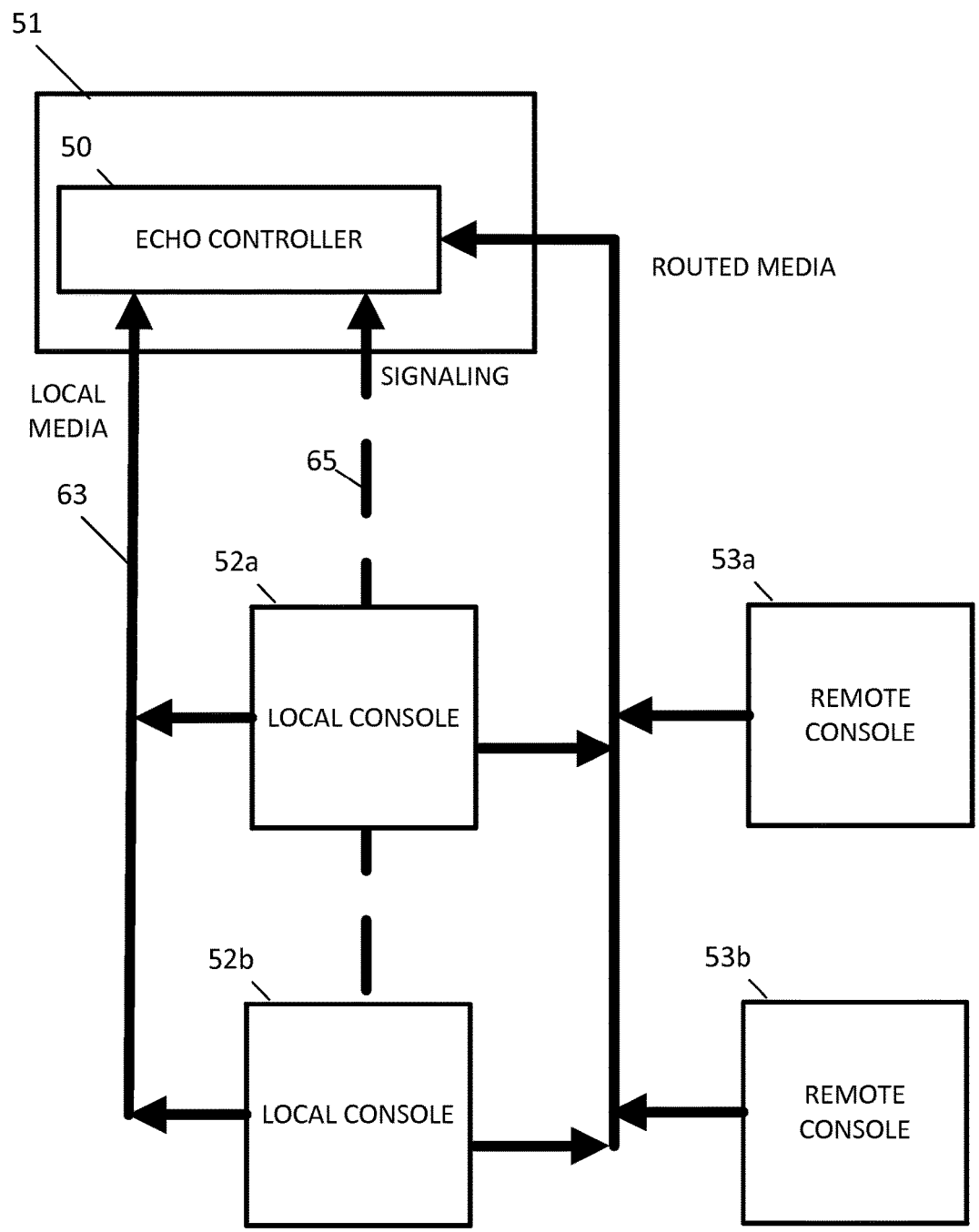
FIG. 5 illustrates another example system of local consoles with from duplicate media and from signaling.

FIG. 5 illustrates an example system including local consoles with cross muting for echo cancellation from duplicate media. The local consoles 52-a-b including cross muting dispatch console 51 are in communication with the remote consoles 53a-b, through either a packet switched network or radio frequency transmissions.

The system includes at least one cross muting dispatch console 51 including an echo controller 50 that operates according to either of the examples above to mute other local consoles 52a-b. That is, the echo controller 50 may mute other local consoles 52a-b based on identification values or echo cancellation from a duplicated media stream.

Floor control is a control algorithm that permits only allows a single speaker to talk at a time in a system. For example, in a push to talk system all other users are prevented from transmitting voice or another signal, when any one other user is already transmitting voice or another signal. When a request to talk is made from a talker, that talker is either granted the ability to talk or is blocked. Unlike a conference bridge only one talker can talk at once.

In a console system, depending upon the particular implementation, a dispatcher may actually receive and hear the blocked audio. Consider an example in which N systems transmit to a console. Each system, assuming the system implements floor control, may have one talker at a time. Bridging the N systems there may be multiple talkers at a time. The bridging systems do not force a single talker floor control among all N systems, and as such traffic that is not locally generated should not be muted.

One or more of the consoles may provide additional features. The consoles may display photos, video and/or provide Internet access. For example, when the consoles are used in a public safety dispatch center (e.g., fire, police, or medical services), the dispatch console may display access incident-related video clips, photographs, and status information. A responder or a bystander may send photos or videos taken by a smartphone or another devices. The photos or video may be exchanged between console devices.

Figure 6:
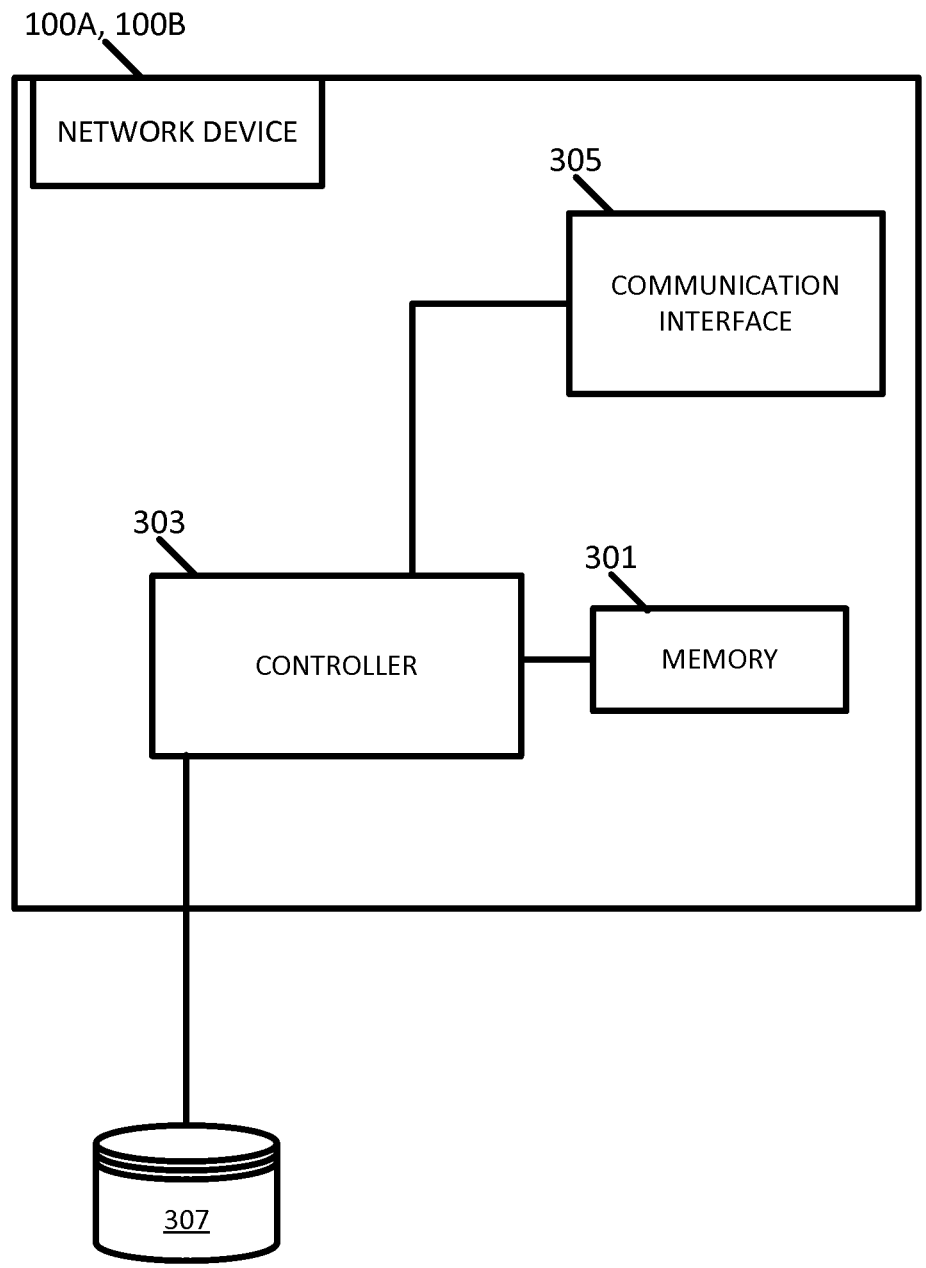
FIG. 6 illustrates an example network device for the system of FIG. 1.

FIG. 6 illustrates another example system of local consoles with from duplicate media and from signaling. The local consoles 52a-b including cross muting dispatch console 51 are in communication with the remote consoles 53a-b, through either a packet switched network or radio frequency transmissions. The cross muting dispatch console 51 may receive a primary media signal from the local consoles 52a-b through communication path 63. The cross muting dispatch console 51 may receive a control signal including duplicated media and/or identification vales through communication path 65. The echo controller 51 may be configured to subtract the duplicate media signal from the primary media signal. The echo controller 51 may be configured to drop, delete, or ignore portions of the primary media based on the identification values.

FIG. 6 illustrates an example network device such as the local cross mute controller 35 or the echo cancel controller 45, which may be referred to alternatively or collectively as a computing device. The computing device includes at least a memory 301, a controller 303, and a communication interface 305. Additional, different, or fewer components may be provided. Different network devices may have the same or different arrangement of components.

In one example, which may be applied by any of the echo cancel controllers described herein, rather than the duplicated media signal, the echo cancel controller may identify metadata from the media signal. The metadata may be a water mark embedded in a portion of the media signal. The metadata may be a side tone included in the metadata. The metadata may instruct the echo cancel controller what portion of the media signal to attenuate or subtract.

Figure 7:
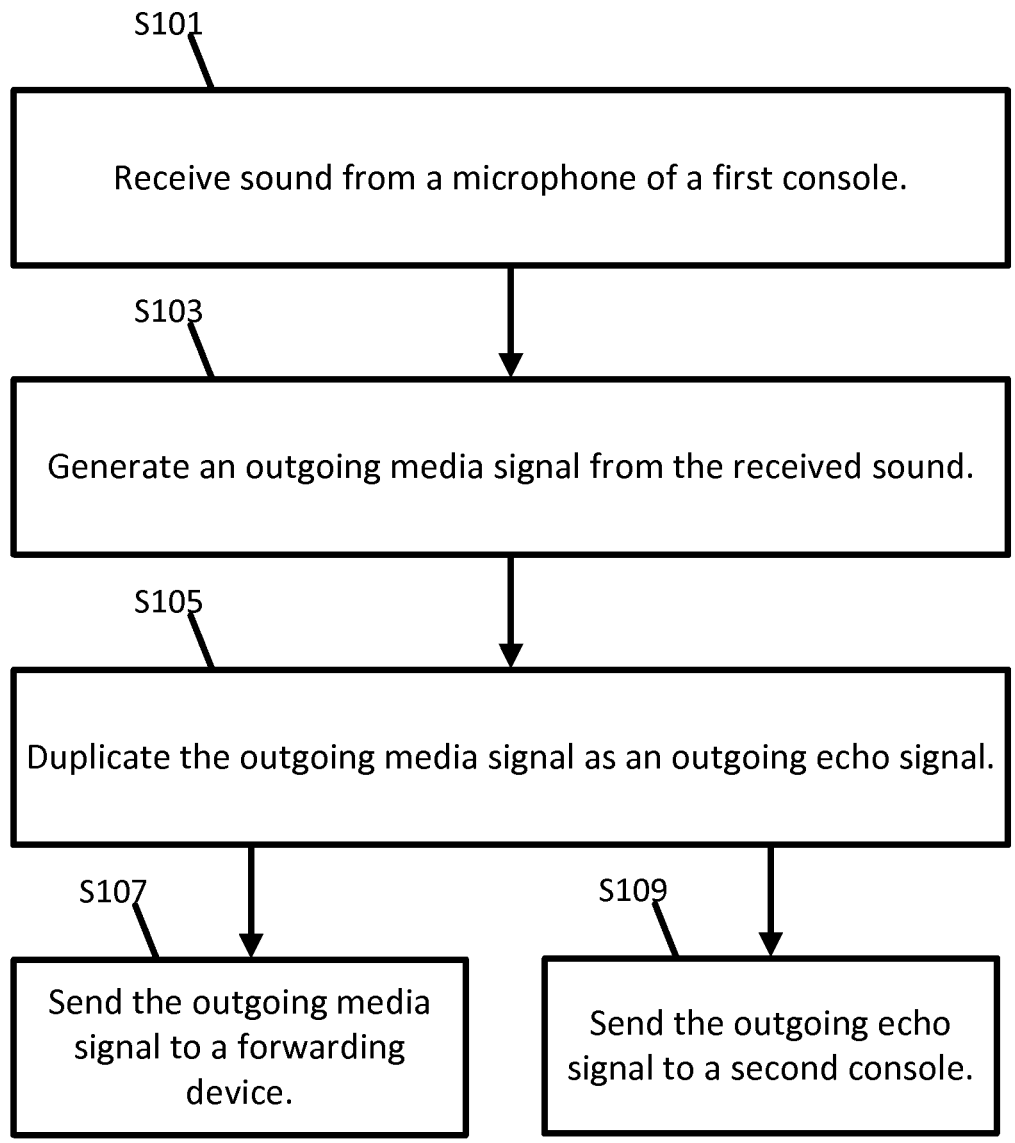
FIG. 7 illustrates an example flowchart for a muted endpoint in cross muting for echo cancellation.

FIG. 7 illustrates an example flowchart for a muted endpoint in cross muting for echo cancellation. Additional, different, or fewer acts may be provided. The acts are performed in the order shown or other orders. The acts may also be repeated.

At act S101, the communication interface 305 or the controller 303 receives sound data detected by a microphone at a first console. At act S103, the controller 303 generates an outgoing media signal from the received sound data. The sound data may be encrypted using an encryption key. The sound data may be filtered to include only the spectrum of the human voice.

The outgoing media signal may be a series of data packets. The data packets may be addressed to a second console. The outgoing media signal may be formatted as radio over internet protocol (VoIP). The outgoing media signal may be combined with a variety of other signals from radio handsets, cellular phones, plain old telephone system phones, or other systems into a signal conversation.

At act S105, the controller 303 duplicates the outgoing media signal, creating an outgoing echo signal. In some examples, the outgoing echo signal is an exact duplicate of the outgoing media signal. In other examples, the outgoing echo signal is a partial duplication of the outgoing media signal or a partially processed version of the outgoing media signal. The outgoing echo signal may be a downsampled version of the outgoing media signal. The outgoing media signal may be a model of the outgoing media signal that includes data indicative of key portions, frequencies, or time periods of the outgoing media signal.

At act S107, the communication interface 305 or the controller 303 sends the outgoing media signal to a network including one or more forwarding devices. The forwarding devices may be any combination of servers, routers, or gateways. The data packets are routed through the network and eventually arriving at the receiving console. The receiving console arranges the packets of the outgoing media signal into the intended sequence.

At act S109, the communication interface 305 or the controller 303 sends the outgoing echo signal to a receiving console. The outgoing echo signal may be sent using a dedicated cable that connects dispatch consoles in the dispatch center. The outgoing echo signal may be sent through a local area network or the Internet.

The receiving console compares the received echo signal to the received media signal. The receiving console removes components of the media signal that corresponds to the echo signal.

Figure 8:
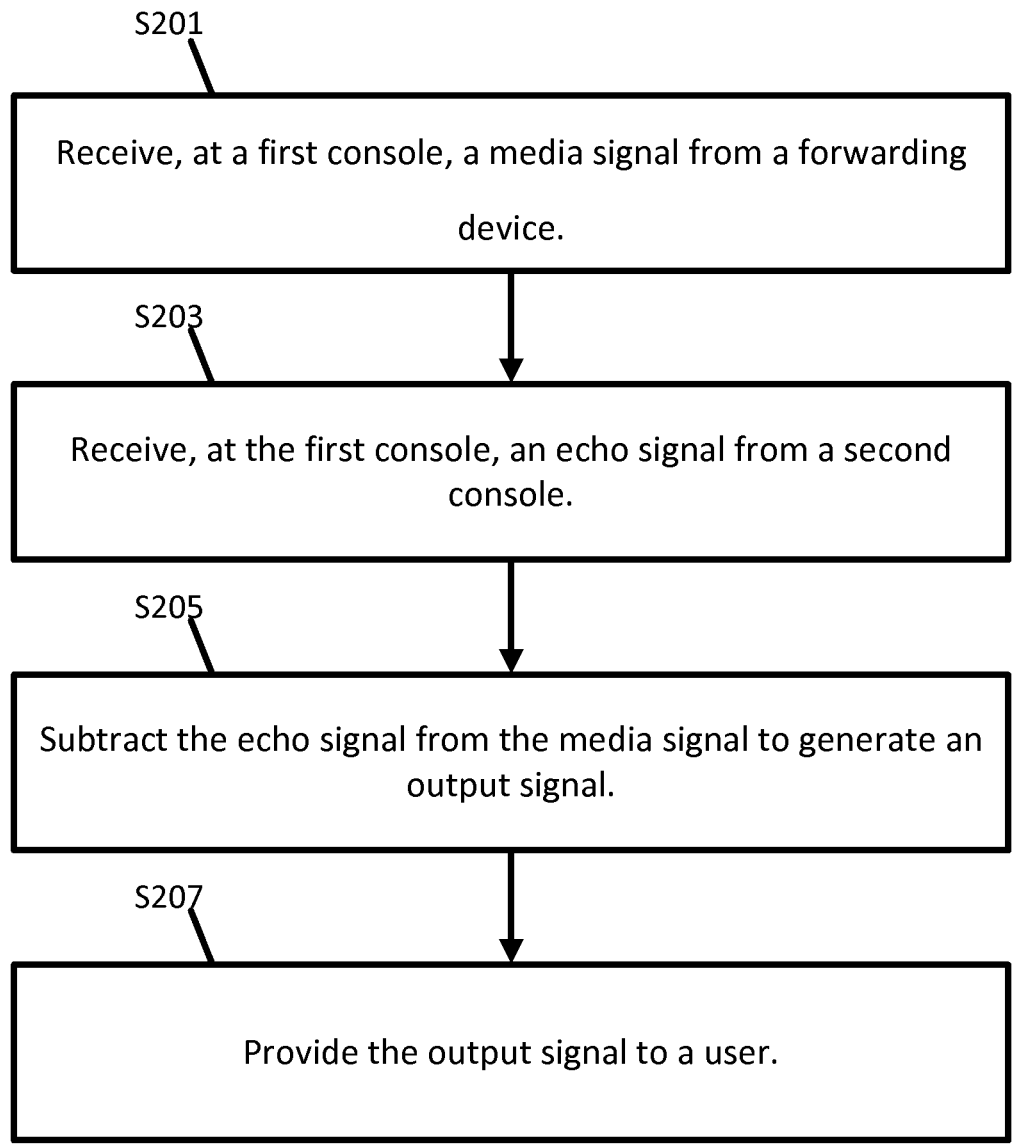
FIG. 8 illustrates an example flowchart for a muting endpoint in cross muting for echo cancellation.

FIG. 8 illustrates an example flowchart for a muting endpoint in cross muting for echo cancellation. Additional, different, or fewer acts may be provided. The acts are performed in the order shown or other orders. The acts may also be repeated.

At act S201, the communication interface 305 or the controller 303 receives a media signal from the forwarding device referenced in act S107. The media signal may include audio from multiple sources. Some of the audio may originate with PTT radios at various locations that transmit data on one or more channels of a radio communication network (e.g., radio frequency communication). Some of the audio may originate with remote dispatch centers at various locations that may be transmitted through radio networks or IP networks. Some of the audio may original with local consoles. The audio from all of these sources may be mixed together at delivered as the media signal to the communication interface 305 or the controller 303.

At act S203, the communication interface 305 or the controller 303 receives an echo signal from the first console sent in act S109. The echo signal may be a duplicated signal from the local consoles in the same dispatch center as the receiving console. In some examples, the echo signal is copy of the output of the local consoles and in other examples, the echo signal is processed to reduce the bandwidth needed to transmit the echo signal. The echo signal may be received through wireless communication (e.g., the protocols known at IEEE 802.11, the protocols known as Bluetooth, or cellular communication) or received through a dedicated physical communication connection (e.g., local area network or communication cable).

At act S205, the controller 303 subtracts or attenuates the echo signal from the media signal to generate an output signal. At act S207, the output signal is provided to a user. The output signal may be provided to a speaker that is played in the dispatch center. The output signal may be recorded by the dispatch consol. In some examples, the output signal is logged for permanent storage. In another example, the recording is on a temporary loop and periodically rewritten. The output signal may be provided to a voice recognition application that converts the spoken words in the output signal to text.

Alternatively, the controller 303 may switch to a specific frequency to prevent audio feedback. That is, when the controller 303 determines a match between the media signal and the echo signal (i.e., the same local speaker is in the echo signal and the media signal), the controller 303 switches to an alternative channel. The alternative channel may have completely different audio. The alternative channel may have remote consoles or other remote signals mixed together but omit signals from the local consoles. The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 103, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The memory 301 is a non-transitory computer-readable medium, which may be a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving sound from a microphone of a first console;
   generating an outgoing media signal from the received sound;
   duplicating the outgoing media signal as an outgoing echo signal to generate a supplementary outgoing signal, wherein a second console is configured to mute a component of an incoming media signal based on the outgoing echo signal, wherein the component of the incoming media signal is associated with the outgoing media signal from the first console;
   sending the outgoing media signal to a forwarding device; and
   sending the supplementary outgoing signal to the second console.

2. The method of claim 1, wherein the first console and the second console are located at a same dispatch center.

3. The method of claim 1, wherein the outgoing echo signal is configured to be subtracted from the outgoing media signal by the second console.

4. The method of claim 1, wherein generating the supplementary outgoing signal comprises:
   generating a control signal including data indicative of an identification number.

5. The method of claim 4, wherein the identification number indicates that the first console is part of a dispatch center.

6. The method of claim 5, wherein the identification number is a first identification number, and the second console is configured to match the first identification number for the first console with a second identification number for the second console.

7. The method of claim 1, wherein the first console is configured for communication with a plurality of push to talk radios.

8. The method of claim 1, further comprising:
   receiving, at the first console, an incoming media signal from the forwarding device;
   receiving, at the first console, an incoming echo signal from the second console;
   subtracting the incoming echo signal from the incoming media signal to generate an output signal; and
   providing the output signal to a user.

9. The method of claim 8, further comprising:
   receiving an external incoming media signal from an external device; and
   mixing the external incoming media signal with the output signal.

10. The method of claim 1, further comprising:
    receiving an encryption key from a key exchange with the second console; and
    encrypting the outgoing echo signal and the outgoing media signal using the encryption key.

11. An apparatus comprising:
    a processor; and
    a memory comprising one or more instructions executable by the processor to perform:
    receiving sound data from a microphone of a first console;
    generating an outgoing media signal from the received sound data; generating a supplementary outgoing signal;
    sending the outgoing media signal to a forwarding device; and
    sending the supplementary outgoing signal to a second console,
    wherein the supplementary outgoing signal comprises a duplication of the outgoing media signal as an outgoing echo signal.

12. The apparatus of claim 11, wherein the first console and the second console belong to a dispatch center.

13. The apparatus of claim 11, wherein the second console mutes a component of an incoming media signal based on the outgoing echo signal, wherein the component is associated with the outgoing media signal from the first console.

14. The apparatus of claim 11, wherein the supplementary outgoing signal comprises a control signal including data indicative of an identification number representative of a group including the first console and the second console.

15. The apparatus of claim 11, the instructions executable by the processor to perform:

receiving, at the first console, an incoming media signal from the forwarding device;

receiving, at the first console, an incoming echo signal from the second console;

subtracting the incoming echo signal from the incoming media signal to generate an output signal; and providing the output signal to a user.

16. A method comprising:

receiving, at a first console, a media signal from a forwarding device, wherein the media signal includes data from a second console mixed with one or more other sources;

receiving, at the first console, an echo signal from the second console;

subtracting the echo signal from the media signal to mute or attenuate the data from the media signal associated with the second console;

generate an output signal as a result of the subtracting; and providing the output signal to a user.

17. The method of claim 16, wherein the one or more other sources include one or more mobile radios.

18. An apparatus comprising:

a processor; and a memory comprising one or more instructions executable by the processor to perform:

receiving, at a first console, a media signal from a forwarding device, wherein the media signal includes data from a second console mixed with one or more other sources;

receiving, at the first console, an echo signal from a second console;

performing a subtraction of the echo signal from the media signal to mute or attenuate the data from the second console in the media signal;

generate an output signal from the subtraction; and providing the output signal to a user.

19. The apparatus of claim 18, wherein the one or more other sources include one or more mobile radios.

* * * * *